(No Model.)

E. ZIMMER.
PLANT PROTECTOR.

No. 346,253. Patented July 27, 1886.

WITNESSES:

INVENTOR:
E. Zimmer
BY Munn & Co
ATTORNEYS.

UNITED STATES PATENT OFFICE.

EUGENE ZIMMER, OF MOBILE, ALABAMA.

PLANT-PROTECTOR.

SPECIFICATION forming part of Letters Patent No. 346,253, dated July 27, 1886.

Application filed March 31, 1886. Serial No. 197,316. (No model.)

*To all whom it may concern:*

Be it known that I, EUGENE ZIMMER, of Mobile, in the county of Mobile and State of Alabama, have invented a new and useful Improvement in Plant-Protectors, of which the following is a specification, reference being had to the annexed drawings, forming a part thereof, in which—

Figure 1:
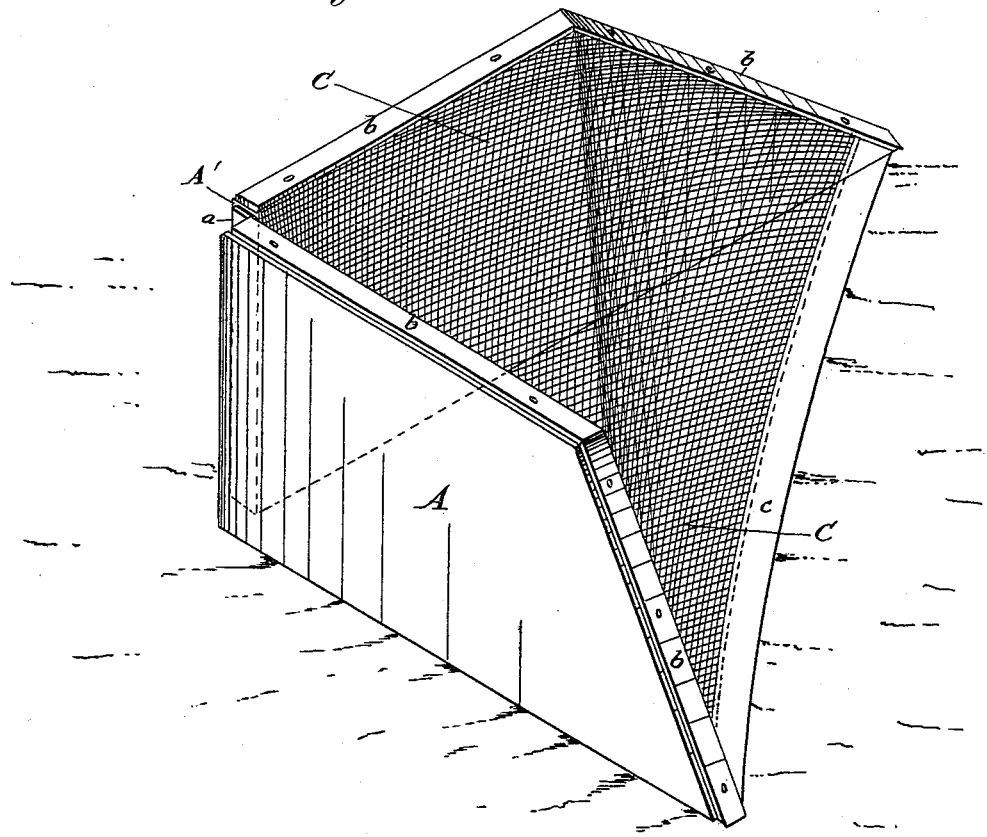
Figure 2:
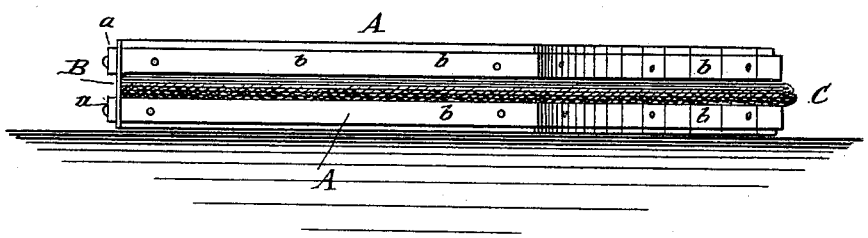

Figure 1 is a perspective view of my improved plant-protector. Fig. 2 shows the protector folded together for storage or transportation.

Similar letters of reference indicate corresponding parts in both figures of the drawings.

The object of my invention is to provide a device which will protect young plants from frost and injury or destruction by insects or fowls, which may be readily folded for transportation or storage, and easily unfolded and placed in position for use.

My invention consists of a pair of trapezoidal boards hinged together at their right-angled ends, and connected by netting or oiled muslin of sufficient size to permit the boards to open to approximately a right angle.

The boards A A', preferably of trapezoidal form, are hinged together at their right-angled ends by the canvas hinge B, which is secured by narrow wooden strips $a$, nailed to the ends of the boards over the edges of the canvas. To the shorter edges and inclined ends of the boards A A' is secured a triangular piece, C, of mosquito-netting or other suitable open fabric, by narrow wooden strips $b$, nailed to the edges of the boards and clamping the netting. To strengthen the free edge of the netting, a cloth binding, $c$, is secured thereto by stitching or in any other suitable way.

The boards A A' are opened, so that they are approximately at right angles with each other or until the netting C is strained, as shown in Fig. 1, when the protector is placed over the plant with the netting facing the south, to allow the sun to shine on the plant; but when it is desired to shield the plant from the sun the position of the protector will be reversed.

When not in use, the protector is folded together, as shown in Fig. 2, with the netting between the boards. Arranged in this way a large number of the protectors may be packed in a very small space.

Having thus described my invention, what I claim, as new, and desire to secure by Letters Patent, is—

A plant-protector formed of boards A A', of trapezoidal form, hinged together at their right-angled ends, and a triangular netting, C, secured to the shorter edge and inclined end of each board, as described.

EUGENE ZIMMER.

Witnesses:
D. W. LANGDON,
C. RAVIER.